United States Patent
Uchida et al.

(10) Patent No.: US 6,642,918 B2
(45) Date of Patent: Nov. 4, 2003

(54) CONTROL OF DIGITAL PROJECTION SYSTEM

(75) Inventors: Yoshiki Uchida, Newport Beach, CA (US); Sadahiro Tanaka, Irvine, CA (US); Robert D. Wadsworth, Costa Mesa, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 09/840,560

(22) Filed: Apr. 23, 2001

(65) Prior Publication Data

US 2002/0154091 A1 Oct. 24, 2002

(51) Int. Cl.[7] .............................................. G09G 5/00
(52) U.S. Cl. ..................... 345/156; 345/157; 345/158
(58) Field of Search ............................. 345/7, 8, 9, 158, 345/169, 173, 156, 157, 700, 781, 810; 348/744, 751, 761; 353/42, 21

(56) References Cited

U.S. PATENT DOCUMENTS

| | | | |
|---|---|---|---|
| 4,846,694 A | 7/1989 | Erhardt | 434/365 |
| 5,428,417 A | 6/1995 | Lichtenstein | 353/122 |
| 5,448,263 A | 9/1995 | Martin | 345/173 |
| 5,455,906 A | 10/1995 | Usuda | 395/162 |
| 5,489,923 A | 2/1996 | Marshall et al. | 345/156 |
| 5,515,079 A | 5/1996 | Hauck | 345/157 |
| 5,528,263 A | 6/1996 | Platzker et al. | 345/156 |
| 5,550,560 A | 8/1996 | Kanada et al. | 345/156 |
| 5,568,963 A | 10/1996 | Bennett et al. | 353/122 |
| 5,664,859 A | 9/1997 | Salerno et al. | 353/119 |
| 5,724,106 A | 3/1998 | Autry et al. | 348/734 |
| 5,782,548 A | 7/1998 | Miyashita | 353/42 |
| 5,793,352 A | 8/1998 | Greenberg et al. | 345/132 |
| 5,874,937 A | 2/1999 | Kesatoshi | 345/127 |
| 5,880,745 A | 3/1999 | Miichi | 345/520 |
| 6,037,943 A | 3/2000 | Crone et al. | 345/357 |
| 6,050,690 A | 4/2000 | Shaffer et al. | 353/122 |
| 6,104,380 A | 8/2000 | Stork et al. | 345/158 |
| 6,108,001 A | 8/2000 | Tuttle | 345/302 |

Primary Examiner—Xiao Wu
(74) Attorney, Agent, or Firm—Fitzpatrick, Cella, Harper & Scinto (57) ABSTRACT

The present invention relates to controlling a presentation device coupled to the presentation system using a user interface generated by a computing system, the user interface including one or more regions which vary in size based on whether the user interface is being displayed, the user interface accepting input from a pointing device to control the presentation device.

37 Claims, 9 Drawing Sheets

CONTROL OF DIGITAL PROJECTION SYSTEM

BACKGROUND OF THE INVENTION

1. Field of the Invention

The present invention relates to controlling a digital presentation system. More particularly, the present invention relates to controlling a presentation device coupled to the presentation system using a user interface generated by a computing system, the user interface including one or more regions which vary based at least in part on a determination of an input source of the presentation system.

2. Description of the Related Art

Digital presentation systems are currently being used that project an image onto a projection screen or other surface using a projector such as a liquid crystal display (LCD) projector. The projector is controlled by a computing system (e.g., a desktop or notebook computer), such that the computing system sends image data to be displayed by the projector as well as control data or commands to be carried out by the projector.

A user interface is typically provided by the computing system to aid a presenter in controlling the projector. The user interface is viewable on the computing system's monitor and may also be projected onto a presentation screen by the projector. To interact with the user interface using the computing system, a user uses an input device such as the computing system's mouse.

Alternatively, in a case that the user interface is projected onto a projection screen, there are various remote pointing devices currently available that may be used to interact with the user interface and provide input. A remote pointing device may be either a wired or wireless device. A wireless pointing device typically operates by sending a signal from the remote device to a receiver that is connected to the computing system.

One example of a remote pointing device has cursor buttons to move a cursor in the horizontal and vertical directions as well as one or more buttons for making a selection. Another example of a remote pointing device is Canon, Inc.'s digitizer pointer that allows a user to point to a location within a calibrated area to change the position of the cursor, and then make a selection.

In the case that the user interface is projected onto the presentation screen, a user is able to use the remote pointing device to interact with the user interface without the need to be located at or near the computing system. Thus, the presenter is provided with more freedom to move around during the presentation.

Just as with the computing system's mouse, when the user moves the remote pointing device around within the projected user interface, a cursor is moved around the projected user interface to mirror the movement of the remote pointing device. This provides visual feedback to the presenter as to the location of the pointing device within the projected user interface. To generate the visual feedback, the computing system detects the movement of the remote pointing device and causes a cursor to be displayed within the projected user interface at the latest detected position.

Using the visual feedback, the user is able to verify that the cursor is over an intended selection before clicking a selection button. If the user clicks a button within an input region of the user interface, the computing system detects the button input and processes the user selection.

U.S. Pat. No. 6,037,943, for example, describes a presentation system in which a user interface including a navigator indicator is displayed on the computer system's display and may be projected onto a presentation screen as well. The navigator indicator includes regions that are selectable to allow the presenter to navigate through a set of slides. The navigator indicator has a default state of hidden. However, when active, it becomes visible to the presenter and the presenter is provided with visual feedback as to the location of the pointer relative to the active areas within the navigator indicator. Using the visual feedback, the presenter is able to select one of the active areas of the navigator indicator. The presenter is provided with visual feedback as to the location whether or not the pointing device was within one of the active areas.

There are occasions, however, when it is not possible and/or desirable to project the user interface on the presentation screen. For example, it may not be desirable to project the user interface on the projection screen because it would disrupt an audience's view of a presentation. Alternatively, the projector may be receiving input from another source other than the computing system. In such a case, the user interface that is output by the computing system to the projector is not being displayed by the projector.

In any case, where a user interface is not viewable on the presentation screen, it would still be beneficial to be able to interact with the user interface using the remote pointing device. For example, it may be desirable to be able to continue to use the remote pointing device to control a presentation regardless of whether the user interface is projected on the presentation screen and/or regardless of whether the computing system is the current input source for the projector.

SUMMARY OF THE INVENTION

The present invention solves the above-mentioned problems and provides a user interface for use in controlling a presentation generated by a presentation system, the presentation system, which comprises a computing system and a projection device, is capable of receiving input from a plurality of input sources including the computing system, the user interface comprising at least one control region of the user interface and at least one presentation control operation associated with the control region, wherein the user interface is modified based on a determination of which one of the plurality of input sources is providing an input signal to the projection device.

Advantageously, the user interface may be used to control the presentation system even in a case where the computing system is not the device that is providing a video signal to the projector. The pointing device continues to operate properly even if the video feed for the projector is switched to some other device (e.g., VCR or DVD player). A user is able to control the presentation system without the need to view the user interface and/or mouse movement feedback. Since there is no need to view the user interface to control the presentation system, a presentation display is not interrupted by the user interface being projected on top of the presentation display.

In another aspect of the invention, a method of controlling a presentation system is provided that comprises a method for use in a computing system, the method providing a user interface of a presentation system, the presentation system including the computing system and a projection device, the projection device capable of receiving video input from a plurality of input sources including the computing system, the method comprising defining a user interface having at least one control region, determining which one of the plurality of input sources is providing an input signal to the projection device, and modifying the user interface based on the result of the determining step.

The user interface may be modified by modifying the control region and/or other regions of the user interface. For example, the control region may be changed in size (e.g., enlarged). In addition, the control region may be moved to another area of the user interface such as at one or more corners, bottom and/or top of the user interface. To ensure that errant input where there are input regions within the user interface other than the control region, input from regions may be disabled and/or not recognized. In so doing, it is possible to minimize or eliminate unwanted operations.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
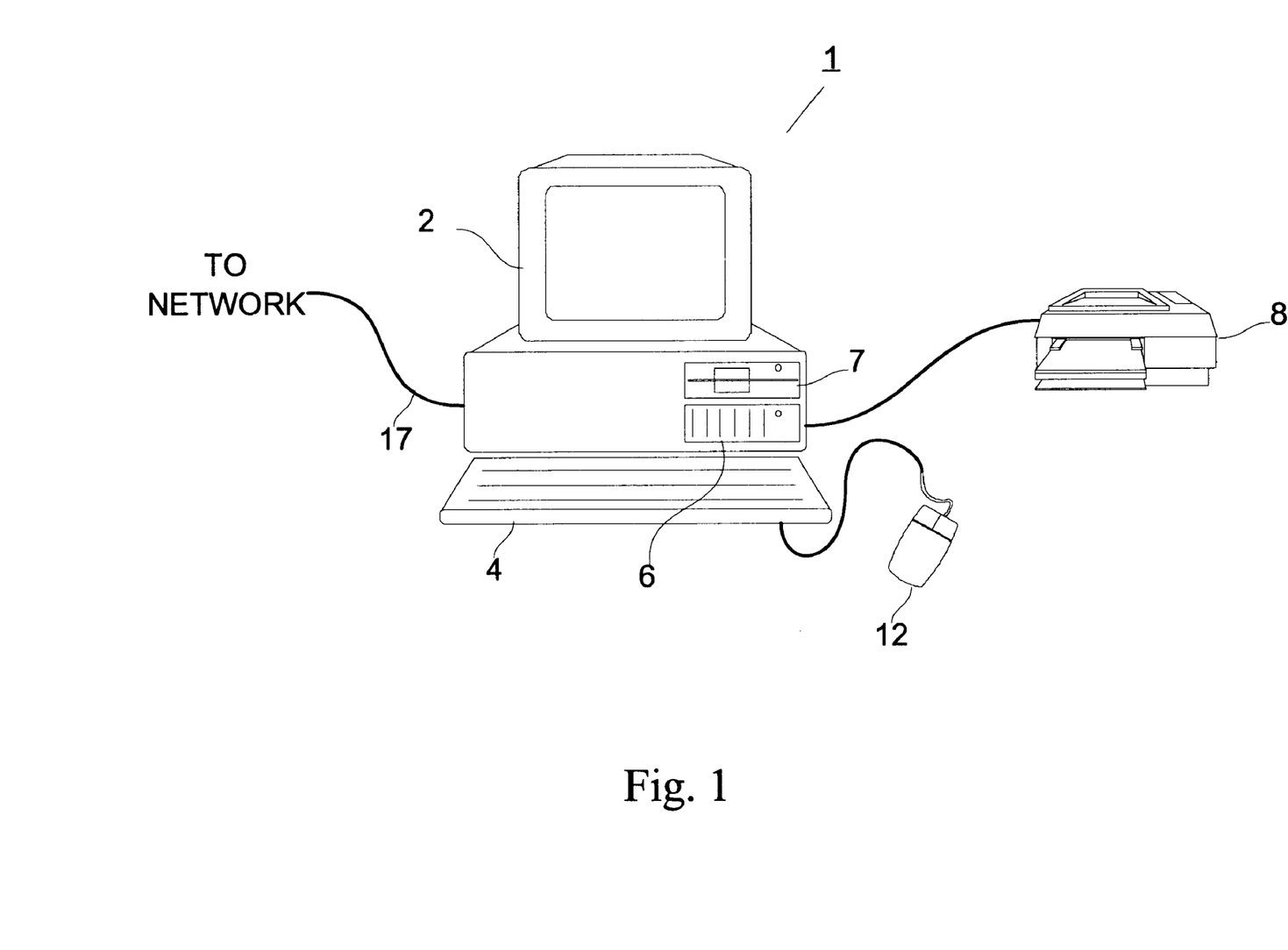
FIG. 1 is an outward view of a hardware environment embodying the present invention.

FIG. 1 is an outward view of representative computing hardware embodying the present invention. Shown in FIG. 1 are computer 1 executing a browser-enabled operating system, such as Microsoft Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a World Wide Web browser application, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown).

Computer 1 further includes a connection 17 to the World Wide Web ("WWW"). While the invention is described with reference to the WWW (also referred to as the Internet), it should be apparent that the invention may be practiced with other types of networks such as an intranet, local area network, etc. Connection 17 may be formed, for example, via a serial modem (not shown) connected to computer 1 and a telephone line which, in turn, is connected to the WWW. It should be noted that computer 1 may be connected to the WWW by other types of connections. By executing a web browser application, web pages and data can be received from the WWW over connection 17 for display on monitor 2 and/or use by computer 1.

A floppy disk drive, such as floppy disk drive 7 may be used to read data from and write data to floppy disks inserted therein. Data and/or applications may also be accessed from a CD-ROM via a CD-ROM drive (not shown) as well as other removable media storage (e.g., Iomega's Zip removable storage media, compact flash, memory stick, etc.) and/or via the network.

Computer 1 is connected to the network via connection 17 which may be a serial modem or other interface (e.g., ethernet card) to connect directly or, indirectly, to the WWW (or other communications network such as local or wide area networks). Connection 17 may be, for example, a telephone line, a T1 line, a local area network connection or the like. In a case that connection 17 connects directly to a local area network, the local area network is preferably connected to a router (not shown), which, in turn, is connected to the WWW. In such a configuration, the router includes firewall software for prevention of unauthorized access to the local area network.

Figure 2:
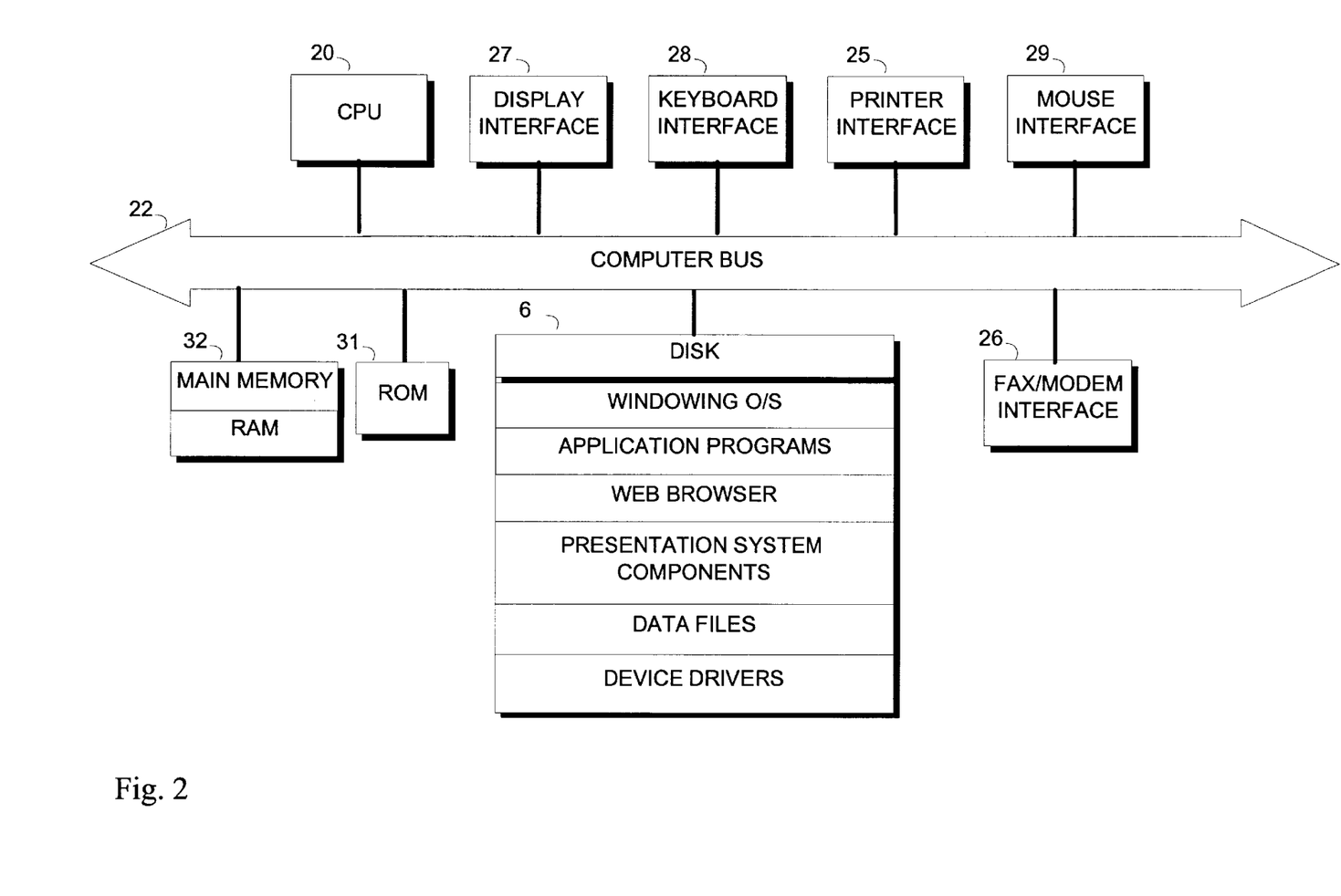
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8, modem interface 26 to enable communications between computer 1 and its internal modem, display interface 27 for interfacing with display monitor 2, keyboard interface 28 for interfacing with keyboard 4, and pointing interface 29 for interfacing with a pointing device such as mouse 5. Of course, if computer 1 connects to the WWW by a connection other than a telephone connection, a suitable interface other than modem interface 29 may be utilized.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps of a web browser, presentation system software components or other applications are transferred from disk 6 over computer bus 22 to RAM 32 and executed therefrom by CPU 20.

Also shown in FIG. 2 is disk 6 which, as described above, includes a windowing operating system, a web browser executable on the particular windowing operating system, other applications which may include word processing, spreadsheet, graphics, gaming applications as well as applications downloaded from the WWW. Disk 6 further includes data files and device drivers as shown.

Computer 1 comprises program code configured to generate a user interface for controlling a presentation system according to the present invention. The program code may be stored on fixed disk 7 or on one or more removable disks such as a floppy disk readable by floppy disk 7, CD-ROM readable by a CD-ROM drive (not shown), and/or a Zip disk.

In addition, computer 1 may comprise other application programs and associated data and files, as well as device drivers for controlling peripheral devices.

The user interface of the present invention is preferably generated using a web browser capable of displaying web pages such as those defined using a markup language (e.g., Hypertext Markup Language or HTML, Dynamic HTML, Extensible Markup Language or XML, etc.). As is discussed below, a server interfaces with a browser to generate the user interface.

The user interface is used to control the manner in which the presentation proceeds. For example, the user interface may include options to start or stop a presentation. During the presentation, the user interface may be used to pause a presentation, and/or backtrack (or reverse) or advance a presentation. It is also possible for the user interface to control features of the projector such as zoom, focus, audio mute and volume, for example.

Another feature that may be controlled using the present invention is the input source of the projector. Examples of various input sources that may be used with a projector include a video cassette recorder, television broadcast, digital video disk player, digital camera, removable storage media reader, scanner, TV-phone and a computing system other than the one providing the user interface.

An input source may provide video as well as audio in the form of streams (e.g., a stream of images and/or audio) or as a single image frame or audio clip. For example, a video cassette recorder may transmit video and audio as a stream, whereas a computer system (e.g., computer 1) may transmit an animation (e.g., an MPEG document) or a single image such as page output of a browser.

Figure 3A:
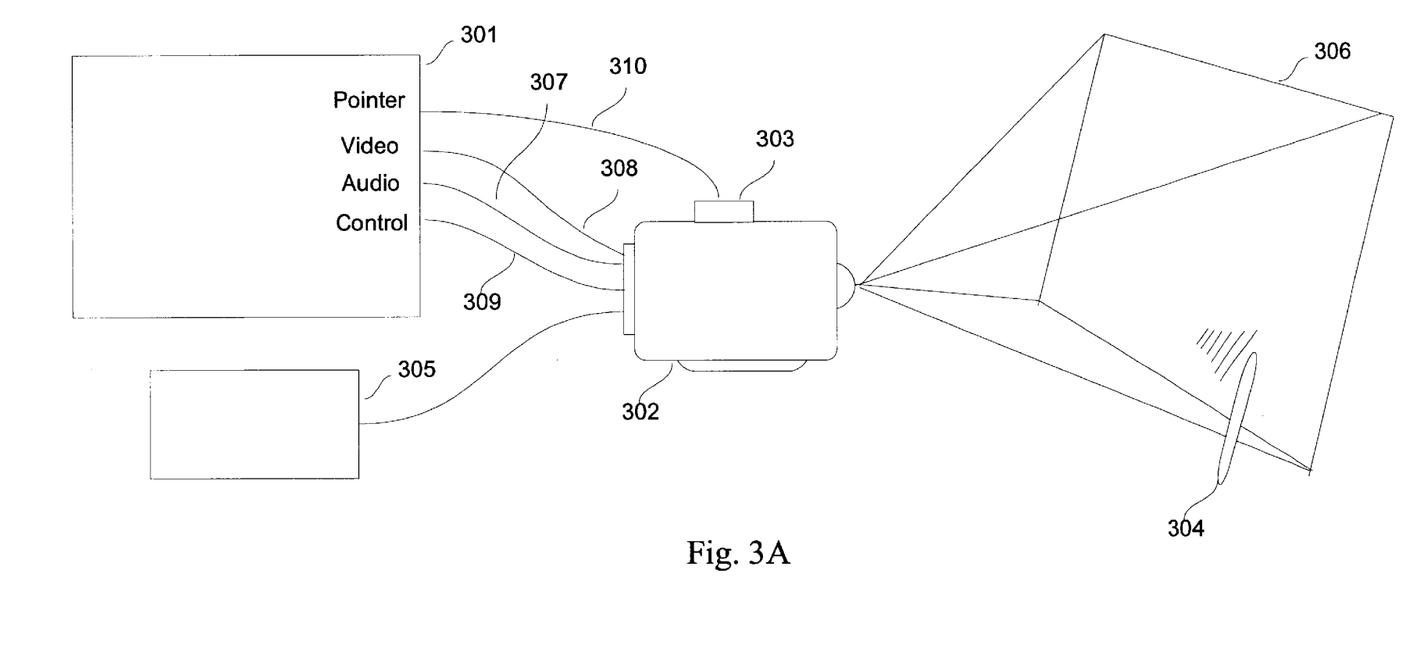
FIG. 3A illustrates an example of a presentation system according to the present invention.

FIG. 3A illustrates an example of a presentation system according to the present invention. Presentation system 300 includes computer 301 and projector 302. Projector 302 is capable of projecting an image onto projection screen 306 based on input received from computer 301 or from input source 305. Input source 305 may be any type of input source that may be interfaced with projector 302 including those mentioned above.

Computer 301, which has a configuration similar to computer 1, is configured to generate a user interface which when computer 301 is the input source for projector 302, is displayable by projector 302. Computer 301 processes input associated with the user interface when it is the input source for projector 302 as well as when it is not the input source. As is described in more detail below, computer 301 may modify the user interface and/or its response to input associated with the user interface based at least in part on whether it is the input source for projector 302.

To display the user interface, computer 301, as the input source for projector 302, forwards the user interface via connection 308 to projector 302 for output on projection screen 306.

Computer 301 is further configured to receive mouse input from wireless pointing device 304 which may be a wireless mouse or a digitized pointer, for example. It should be apparent that other pointing devices such as a wired pointing device may also be used with the present invention.

Receiver 303 receives signals transmitted from wireless pointing device 304, including cursor movement and button click signals, and forwards them to computer 301 via connection 310. In response to mouse movement during such time as computer 301 is the input source, computer 301 forwards cursor positioning information to projector 302 via connection 308, causing projector 302 to update the user interface to reflect the cursor movement.

If a button of pointing device 304 is clicked, computer 301 makes a determination as to the response that is needed. As is discussed more fully below, computer 301 forwards one or more commands to projector 302 via connection 308 to carry out a request of a user where appropriate.

The user interface that is generated by computer 301, and which may be displayed by projector 302, is preferably generated by a browser executing on computer 301. However, any of a number of user interface generation tools familiar to those skilled in the art may be used to generate the user interface.

Figure 3B:
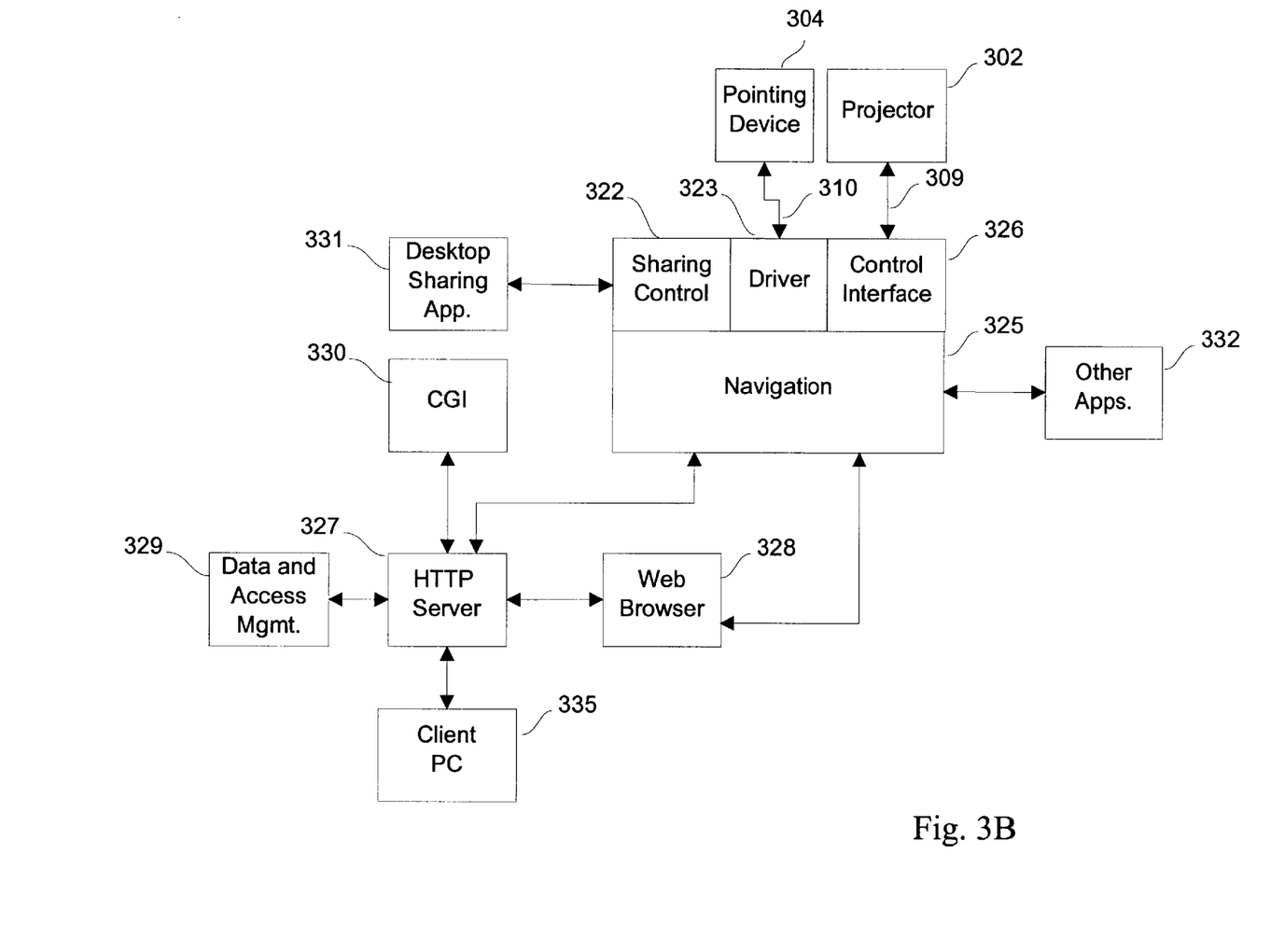
FIG. 3B illustrates an example of a software architecture of a computer system configured to control a presentation according to the present invention.

FIG. 3B illustrates an example of a software architecture of computer 301 according to the present invention.

Computer 301 comprises desktop sharing control 322, pointer driver 323, navigation 325, control interface 326, server 327, browser 328, data/access management 329, Common Gateway Interface ("CGI") program(s) 330, desktop sharing application 331 and none or more of application 332 which may be for example, a word processing, spreadsheet or graphics application.

Navigation 325 is preferably implemented using a scripting language such as JavaScript® which is executable within browser 328. Navigation 325 provides an interface between browser 328 and control interface 326, driver 323 and sharing control 322.

CGI program(s) 331 may be used for password authentication or modification, to handle a data upload such as when client PC 335 uploads presentation data, or to retrieve or change a configuration setting associated with projector 302.

Server 327 is configured to communicate with browser 328 to display the user interface of the present invention. Navigation 325 transmits page definitions (e.g., HTML or DHTML data) to server 327 which in turn forwards the definition to browser 328 to generate display output. The user interface that is output by browser 328 may be forwarded to projector 302 via connection 308 in a case that computer 301 is the input source for projector 302.

Control interface 326 communicates with projector 302 via connection 309 to forward commands and receive communications from projector 302. Projector 302 may communicate its status, or the status of an input source connected to projector 302, in response to a status request sent by control interface 326.

Desktop sharing control 322 provides an interface between navigation 325 and desktop sharing application 331. Desktop sharing application 331 may be used to allow an authorized user using client PC 335 to control computer 301 from client PC 335. For example, it is possible to interact with applications such as browser 328 and application 332 executing on computer 301 to configure and initiate a presentation. A more detailed discussion of such capability is described in U.S. patent application Ser. No. 09/664,971, entitled Electronic Presentation System, filed on Sep. 18, 2000, which is commonly assigned and is incorporated herein in its entirety by reference.

Driver 323 communicates with pointing device 304 via connection 310. As previously indicated, a wired or wireless pointing device may be used with the present invention. Preferably, a wireless pointing device such as pointing device 304 is used. In such a case, pointing device 304 transmits device input via receiver 303 and connection 310. However, as is illustrated in FIG. 3B, pointing device 304 may be connected to computer 301 directly via connection 310 via a wired connection.

Driver 323 receives input from pointing device 304 which is forwarded to navigation 325. Where the received input suggests, one or more control commands are sent to projector 302 via control interface 326.

Figure 4A:
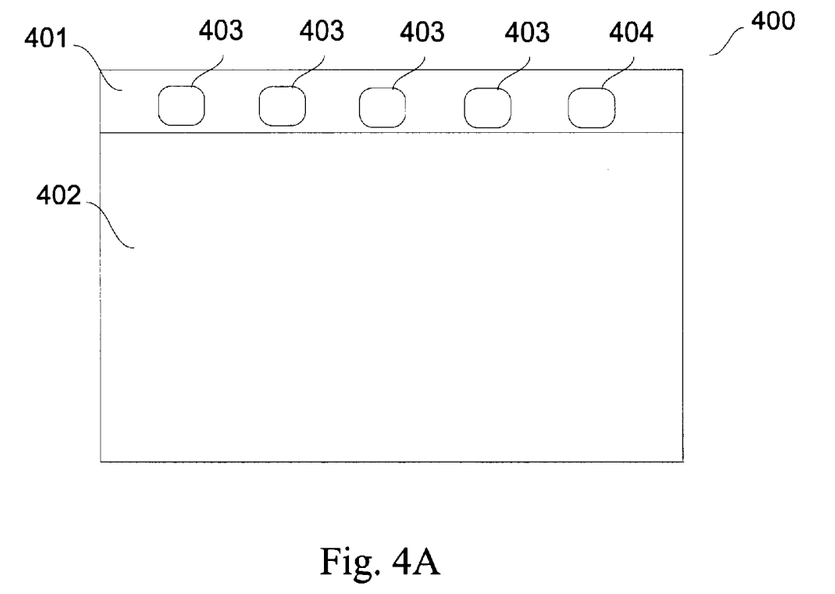
FIG. 4A illustrates a user interface according to the present invention.

FIG. 4A illustrates an example of a user interface generated by computer 301 according to the present invention. User interface 400 includes a toolbar frame 401 and a main frame 402. Toolbar frame 401 includes buttons 403 and 404. Main frame 402 may include input regions (e.g., buttons, menus, text input fields, etc.) as well. Similarly, toolbar frame 401 may include types of input regions other than buttons 403 and 404. Buttons 403 and 404 of toolbar frame 401 and input regions of main frame 402 may be used to control a presentation and/or projector 302.

At least one of the input regions in toolbar frame 401 or main frame 402 is designated as a presentation control region that is "enabled" even in a case that computer 301 is determined to not be the input source for projector 302. Input that is received by computer 301 from within an "enabled" region is processed by computer 301. Input that is received from any other region (i.e., a "disabled" region) is ignored by computer 301.

Button 404 of toolbar frame 401, for example, may be an input region that is enabled regardless of the input source, and corresponds to a request to set the input source of projector 302 as computer 301. As an "enabled" region, input received while the cursor is within the boundaries, or region, of button 404 is processed by computer 301 regardless of whether computer 301 is the input source for projector 302.

Figure 4B:
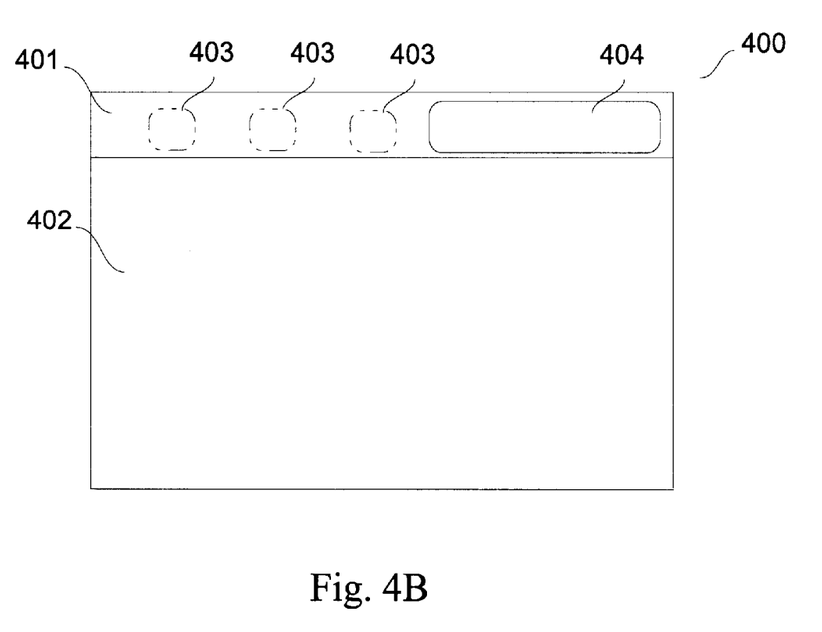
FIG. 4B illustrates a modified user interface according to the present invention.

In addition to input from an "enabled" region, computer 301 may modify the boundaries of an "enabled" region. For example, an "enabled" region's boundaries may be enlarged, and may encompass some or all of another, "disabled" region as well as other areas of the user interface. As is illustrated in FIG. 4B, button 404 of toolbar frame 401 is enlarged from its size in FIG. 4A. As is illustrated by FIGS. 4A and 4B, an enlarged button 404 consumes one of buttons 403. Button 404 may actually be enlarged to the entire area of toolbar frame 401, main frame 402 or both.

An "enabled" input region may also be relocated to another area of the user interface such as a corner region of user interface 400. In yet another alternative, more than one region of user interface 400 may be used for an "enabled" region. For example, an "enabled" region can be defined to be more than one of the corners of user interface 400.

Figure 5A:
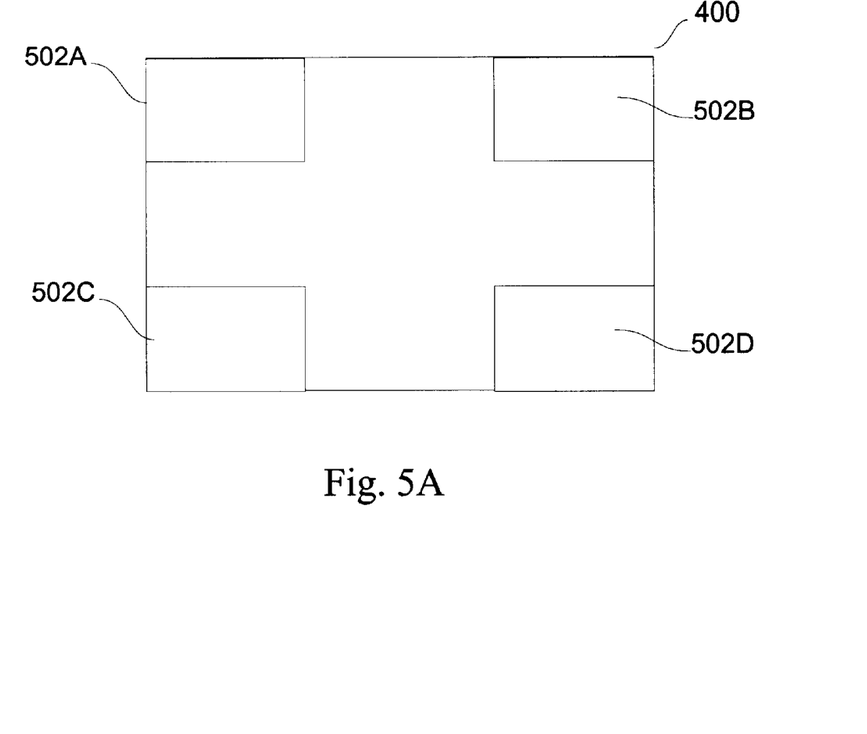
FIGS. 5A through 5D illustrate examples of "enabled" regions of a user interface according to the present invention.
Figure 5B:
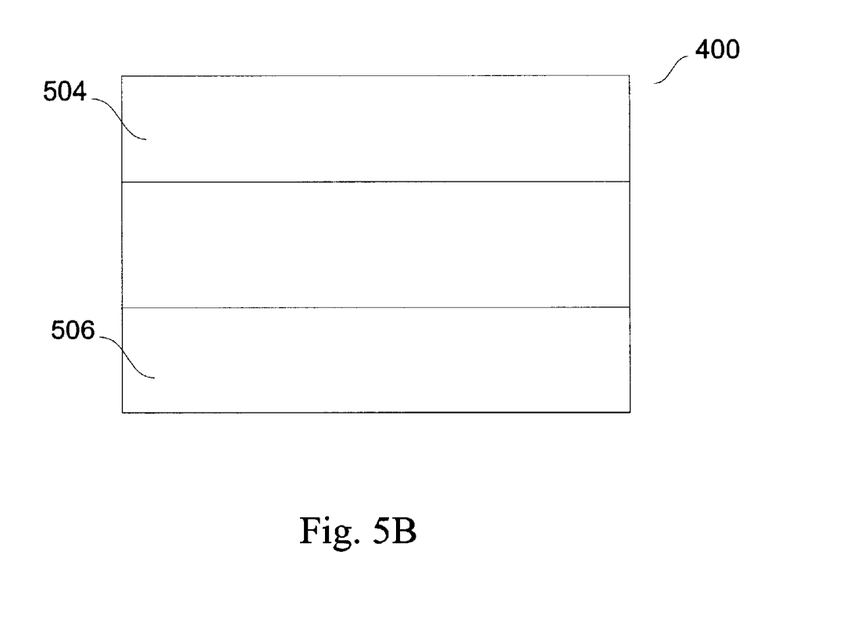
Figure 5C:
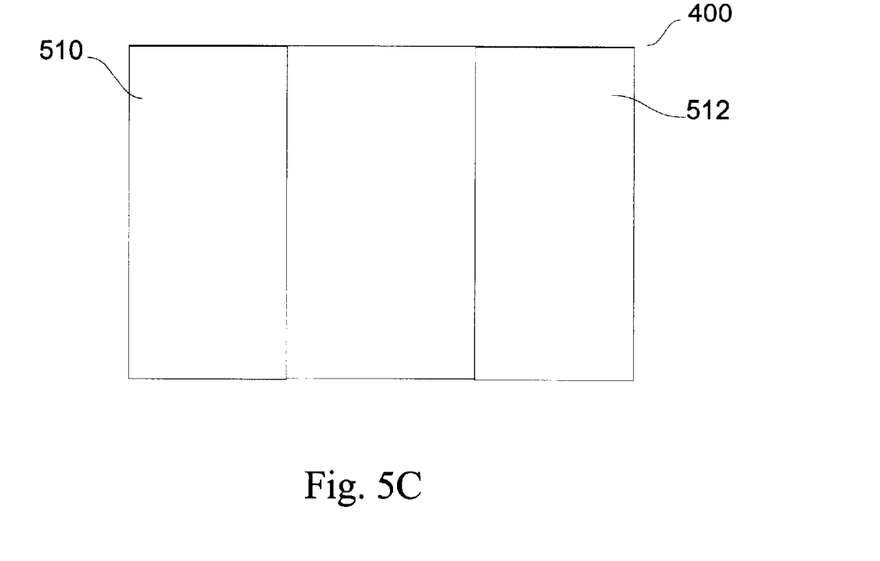

For example, in FIG. 5A, one or more of regions 502A to 502D of user interface 400 may correspond to an "enabled" region. Further, as is illustrated in FIGS. 5B and 5C, one or more of top region 504 and bottom region 506 of user interface 400 and/or one or more of left region 510 and right region 512 of user interface 400 may correspond to an "enabled" region.

Figure 5D:
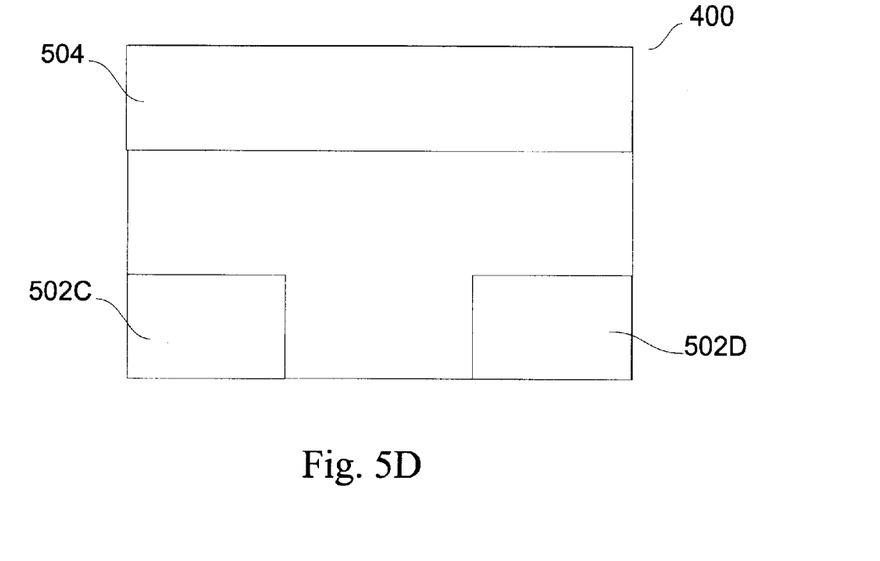

It should be apparent that any combination of regions 502A to 502D, 504, 506, 510 and 512 may be used as well. Referring to FIG. 5D, region 504 is used in combination with regions 502C and 502D. Region 504 may be associated with changing the input source of projector 302 to computer 301. Regions 502C and 502D may be used to control the current input source. For example, where the current input source is a removable media reader which reads a file containing slides stored on a removable media, regions 502C and 502D may result in stepping back or forward (respectively) through the slides.

Using the present invention, it is possible to define an "enabled" region and the action to be taken in response to input from the "enabled" region based at least in part on a determination of the input source for projector 302. Where, for example, the input source is a video cassette recorder, an "enabled" region may be defined to control one or more of the operations of the video cassette recorder (e.g., play, pause, stop, fast forward, rewind, frame forward, frame back, etc.). Similarly, a slide input source may have associated "enabled" regions to advance a frame, or slide, or return to a previous slide.

In addition to the input source, a response may be dependent on input previously received from an "enabled" region and/or commands previously sent to projector 302 to control an input source as well as status information received from projector 302.

For example, a video cassette recorder may currently be fast forwarding a tape as a result of a command (or commands) sent to projector 302 in response to input received from an "enabled" region. In such a case, the "enabled" region may be redefined and a response to input received therein may be generated to cause a command (or commands) to be sent to projector 302 to cause the video cassette recorder to stop fast forwarding the tape. A determination of the current state of the input source may be made based on previously-sent commands and/or status information received from projector 302.

Figure 6A:
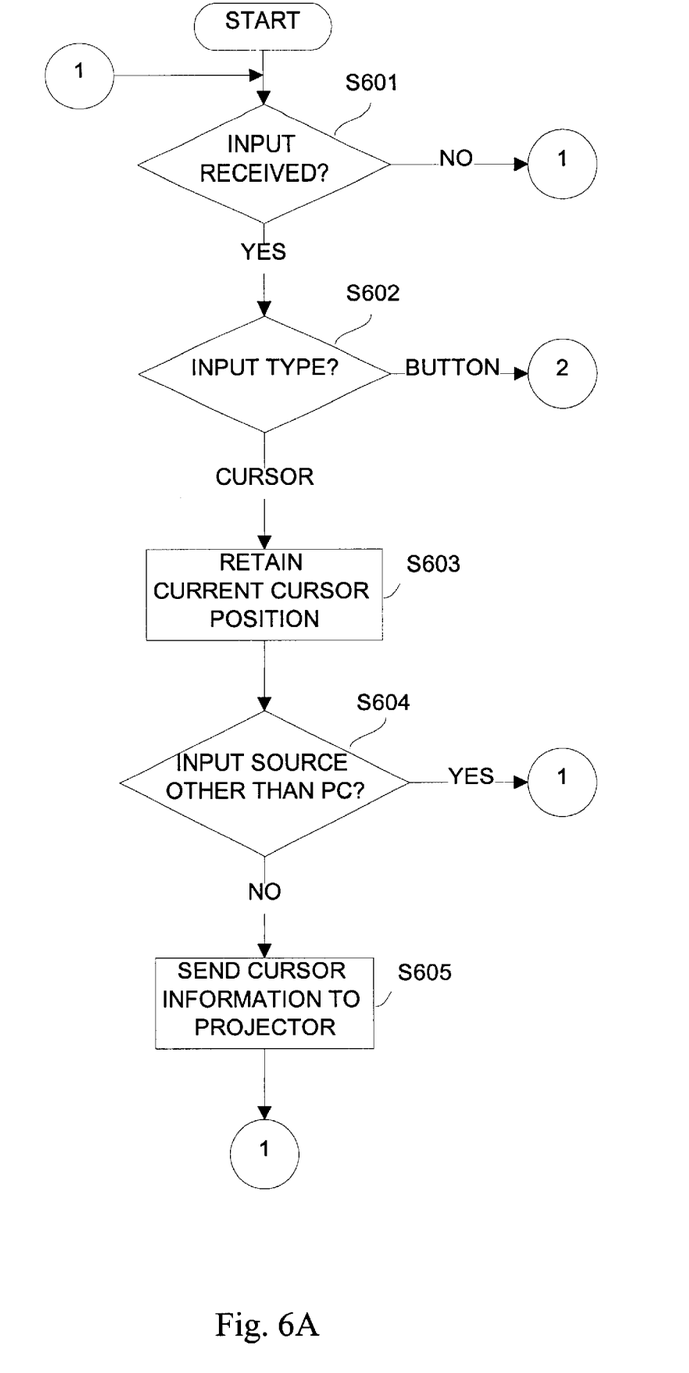
FIGS. 6A and 6B illustrate a flow diagram of process steps to process input received from a user interface used to control a presentation according to the present invention.
Figure 6B:
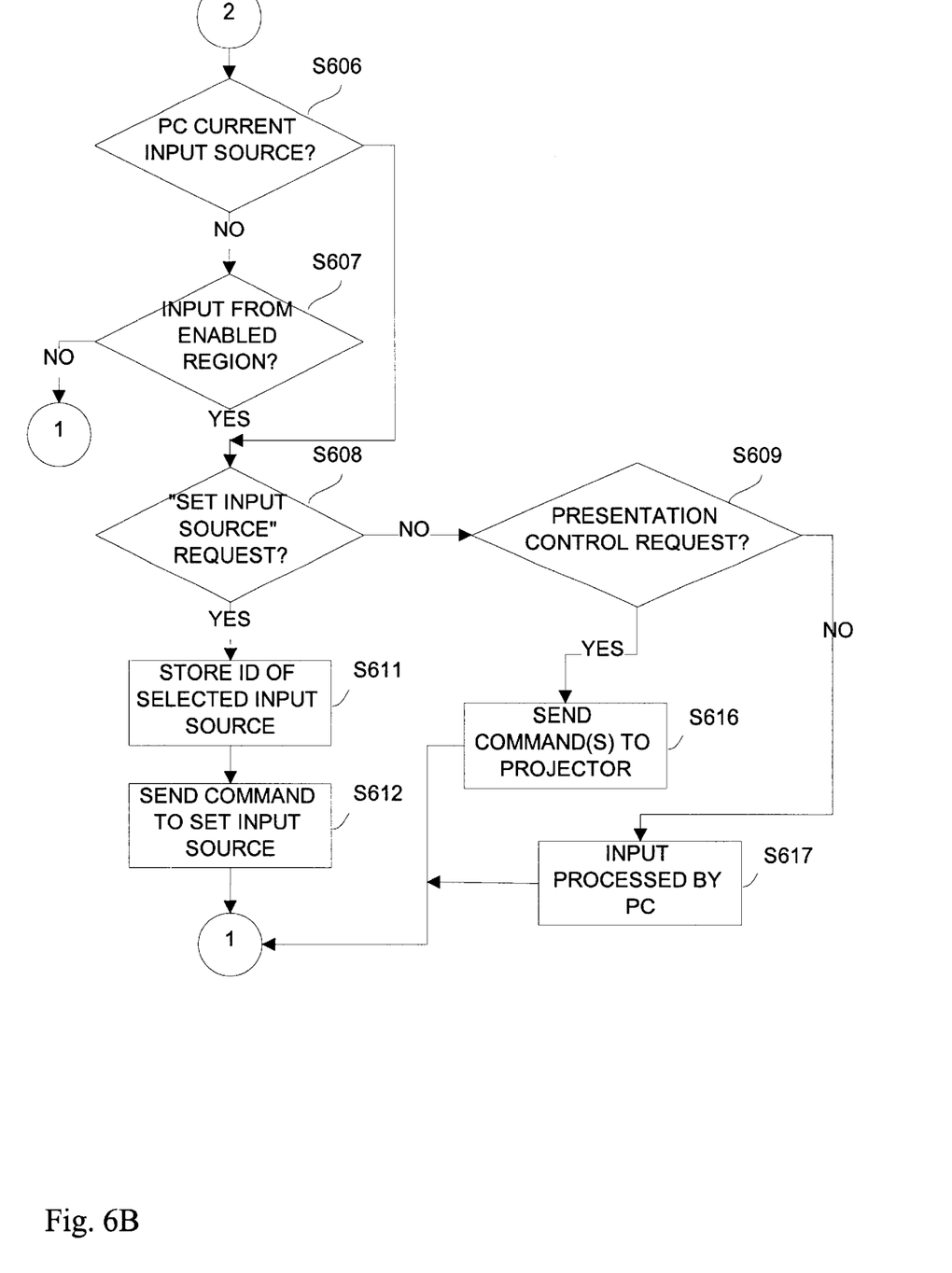

FIGS. 6A and 6B illustrate a flow diagram of process steps to process input received from user interface 400 according to the present invention.

At step S601, a determination is made whether input has been received from within user interface 400. Such input includes cursor movement and button input from pointing device 304. If not, processing continues at step S601 to await input.

If it is determined, at step S601, that input has been received, processing continues at step S602 to determine the input type. If it is determined that the input is button input, processing continues at step S606 of FIG. 5B which is discussed more fully below.

If it is determined, at step S602, that the input is cursor input, processing continues at step S603 to identify and store the current cursor location. At step S604, a determination is made whether the input source of projector 302 is other than computer 301. If not, processing continues at step S605 to send cursor movement information to projector 302 to update the projected display of the user interface 400. In so doing, feedback is provided with regard to movement of the cursor by pointing device 304.

If it is determined, at step S604, that computer 301 is not the input source for projector 302, it is not necessary to send cursor movement information to projector 302. Thus, processing continues at step S601 to await additional input.

If, it is determined at step S602, that the input is button input instead of cursor movement input, processing continues at step S606 of FIG. 6B.

Referring to FIG. 6B, a determination is made at step S606 whether computer 301 is the input source for projector 302. If the input source is computer 301, processing continues at step S608 to process the input.

If it is determined, at step S606, that the input source is not computer 301, processing continues at step S607 to determine whether the input is received from within an "enabled" region. That is, a determination is made at step S607 whether or not the current position of the cursor, as retained in step S603, is within an "enabled" region. If not, no response is needed, since computer 301 is not the input source for projector 302 and the button input was not within an "enabled" region. Thus, processing continues at step S601 to await additional input.

However, if it is determined, at step S607, that the button input was within an "enabled" region, processing continues at step S608 to determine whether the "enabled" region corresponds to a "set input source" request. If so, processing continues at step S611 to store an identification of the input source selected (e.g., computer 301). Processing then continues at step S612 to send one or more commands to projector 302 to set the input source according to the button input, and processing continues at step S601 to await additional input.

If it is determined at step S608 that the region in which button input is received does not correspond to a "set input source" request, processing continues at step S609 to determine whether the region in which button input is received corresponds to another presentation control request. If so, computer 301 sends one or more commands that correspond to the request to projector 302 at step S616. Requests that do not require a command to be sent to projector 302 are processed by computer 301 at step S617. In either case, processing continues at step S601 to await additional input.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A user interface for use in controlling a presentation generated by a presentation system, the presentation system comprising a computing system and a projection device, the projection device is capable of receiving input from a plurality of input sources including the computing system, the user interface comprising:
    at least one control region of the user interface, at least one presentation control operation being associated with the control region,
    wherein the user interface is modified based on a determination of which one of the plurality of input sources is providing an input signal to the projection device, and
    wherein other regions of the user interface are disabled in the user interface if it is determined that the one of the plurality of input sources is other than the computing system.

2. A user interface according to claim 1, wherein the control region is enlarged if it is determined that the one of the plurality of input sources is other than the computing system.

3. A user interface according to claim 1, wherein the control region is moved if it is determined that the one of the plurality of input sources is other than the computing system.

4. A user interface according to claim 3, wherein the control region is moved to one or more corners of the user interface.

5. A user interface according to claim 3, wherein the control region is moved to at least one of a top region and a bottom region of the user interface.

6. A user interface according to claim 1, wherein the user interface includes at least one region other than the control region, the control region and the at least one other region are buttons of a toolbar, wherein the control region button is enlarged and the other buttons are disabled if it is determined that the one of the plurality of input sources is other than the computing system.

7. A user interface according to claim 1, wherein the at least one presentation control operation is changed based at least in part on which one of the plurality of input sources is providing an input signal to the projection device.

8. A user interface according to claim 1, wherein the control region corresponds to a presentation control operation that causes the computing system to be used as the input source.

9. A user interface according to claim 1, wherein the input sources to the projection device further comprise at least one of video cassette recorder, television broadcast, digital video disk player, digital camera, removable storage media reader, scanner, TV-phone, another computing system.

10. A user interface according to claim 1, wherein mirroring cursor movement is suspended while an input source other than the computing system is providing input to the projection device.

11. A user interface according to claim 1, wherein the input source is other than the computing system, and wherein the presentation control command commands the projection device to control the input source.

12. A user interface according to claim 11, wherein the presentation control command causes the projection device to advance a presentation.

13. A user interface according to claim 12, wherein the presentation comprises still images, wherein the presentation control command causes the projection device to advance the presentation by one or more image frames.

14. A user interface according to claim 12, wherein the presentation comprises animations, and wherein the presentation control command causes the projection device to start an animation.

15. A user interface according to claim 11, wherein the presentation control command causes the projection device to reverse a presentation by one or more image frames.

16. A user interface according to claim 11, wherein the presentation control command causes the projection device to pause a presentation.

17. An apparatus for providing a user interface for use in controlling a presentation generated by a presentation system, the presentation system comprising a computing system and a projection device, the projection device is capable of receiving input from a plurality of input sources including the computing system, the apparatus comprises:
    a program memory for storing process steps executable to perform a method according to any of claims 1 to 16, and
    a processor for executing the process steps stored in said program memory.

18. Computer-executable process steps stored on a computer readable medium, said computer-executable process steps for providing a user interface for use in controlling a presentation generated by a presentation system, the presentation system comprising a computing system and a projection device, the projection device is capable of receiving input from a plurality of input sources including the computing system, said computer-executable process steps comprising process steps executable to perform a method according to any one of claims 1 to 16.

19. A method for use in a computing system for providing a user interface of a presentation system that includes the computing system and a projection device, the projection device capable of receiving video input from a plurality of input sources including the computing system, the method comprising:
    defining a user interface having at least one control region;

determining which one of the plurality of input sources is providing an input signal to the projection device; and modifying the user interface based on the result of the determining step, wherein other regions of the user interface are disabled in the user interface if it is determined that the one of the plurality of input sources is other than the computing system.

20. A method according to claim 19, wherein the control region is enlarged if it is determined that the one of the plurality of input sources is other than the computing system.

21. A method according to claim 19, wherein the control region is moved if it is determined that the one of the plurality of input sources is other than the computing system.

22. A method according to claim 21, wherein the control region is moved to one or more corners of the user interface.

23. A method according to claim 21, wherein the control region is moved to at least one of a top region and a bottom region of the user interface.

24. A method according to claim 19, wherein the user interface includes at least one region other than the control region, the control region and the at least one other input region are buttons of a toolbar, wherein the control region button is enlarged and the other buttons are disabled if it is determined that the one of the plurality of input sources is other than the computing system.

25. A method according to claim 19, wherein the at least one presentation control operation is changed based at least in part on which one of the plurality of input sources is providing an input signal to the projection device.

26. A method according to claim 19, wherein the control region corresponds to a presentation control operation that causes the computing system to be used as the input source.

27. A method according to claim 19, wherein the input sources to the projection device further comprise at least one of video cassette recorder, television broadcast, digital video disk player, digital camera, removable storage media reader, scanner, TV-phone, another computing system.

28. A method according to claim 19, wherein mirroring cursor movement is suspended while an input source other than the computing system is providing input to the projection device.

29. A method according to claim 19, wherein the input source is other than the computing system, and wherein the presentation control command commands the projection device to control the input source.

30. A method according to claim 29, wherein the presentation control command causes the projection device to advance a presentation.

31. A method according to claim 30, wherein the presentation comprises still images, wherein the presentation control command causes the projection device to advance the presentation by one or more image frames.

32. A method according to claim 30, wherein the presentation comprises animations, and wherein the presentation control command causes the projection device to start an animation.

33. A method according to claim 29, wherein the presentation control command causes the projection device to reverse a presentation by one or more image frames.

34. A method according to claim 29, wherein the presentation control command causes the projection device to pause a presentation.

35. A method for providing a user interface for use in controlling a presentation generated by a presentation system, the presentation system including a computing system and a projection device, the projection device is capable of receiving presentation data from a plurality of input sources including the computing system, the method comprising:

generating at least one control region of the user interface, at least one presentation control operation being associated with the control region, wherein at least two or more of the plurality of input sources are separately connected to the projection device and the user interface is modified based on a determination of which one of the plurality of input sources is providing an input signal to the projection device.

36. An apparatus for providing a user interface for use in controlling a presentation generated by a presentation system, the presentation system comprising a computing system and a projection device, the projection device is capable of receiving presentation data from a plurality of input sources including the computing system, the apparatus comprising:

a program memory to store process steps to generate at least one control region of the user interface, at least one presentation control operation being associated with the control region; and a processor for executing the process steps stored in said program memory, wherein at least two or more of the plurality of input sources are separately connected to the projection device and the user interface is modified based on a determination of which one of the plurality of input sources is providing an input signal to the projection device.

37. Computer-executable process steps stored on a computer readable medium, said computer-executable process steps for providing a user interface for use in controlling a presentation system, the presentation system including a computing system and a projection device, the projection device capable of receiving presentation data from a plurality of input sources including the computing system, said computer-executable process steps comprising:

a step of generating at least one control region of the user interface, at least one presentation control operation being associated with the control region, wherein at least two or more of the plurality of input sources are separately connected to the projection device and the user interface is modified based on a determination of which one of the plurality of input sources is providing an input signal to the projection device.

* * * * *